April 17, 1934. W. E. BURNELL ET AL 1,954,918
MEANS TO PREVENT DOUBLE EXPOSURES IN USING PLATE OR FILM HOLDERS FOR CAMERAS
Filed Sept. 3, 1932   2 Sheets-Sheet 1
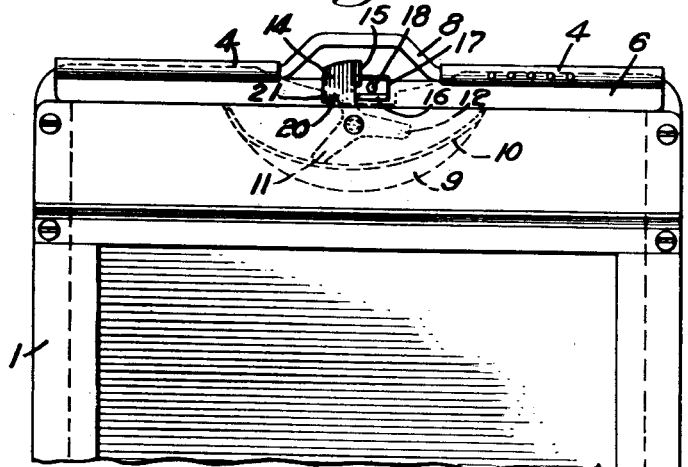
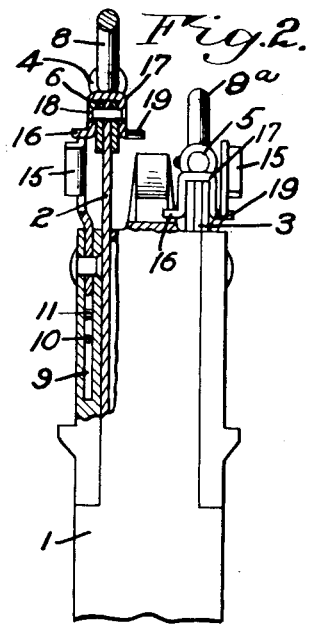
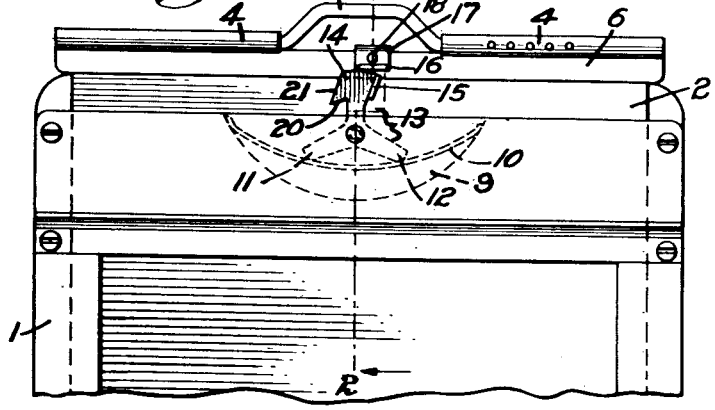
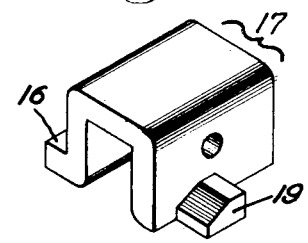
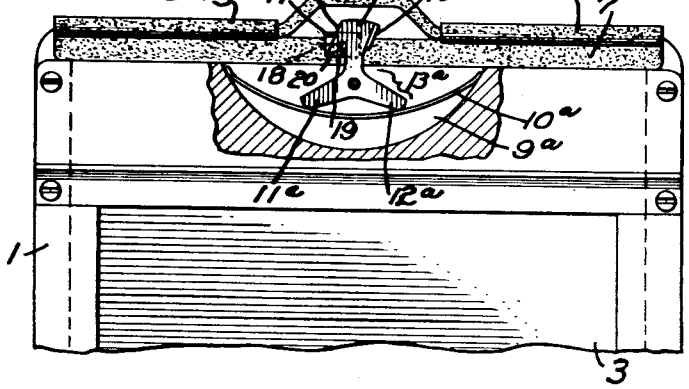
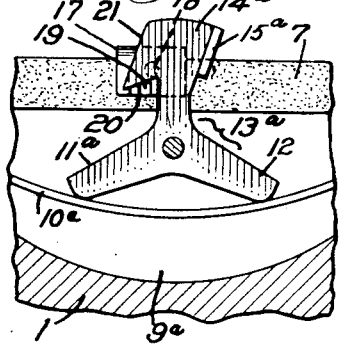
INVENTORS
William E. Burnell,
William H. Petit,
Charles H. Roth,
their ATTORNEYS April 17, 1934. W. E. BURNELL ET AL 1,954,918
MEANS TO PREVENT DOUBLE EXPOSURES IN USING PLATE OR FILM HOLDERS FOR CAMERAS
Filed Sept. 3, 1932  2 Sheets-Sheet 2
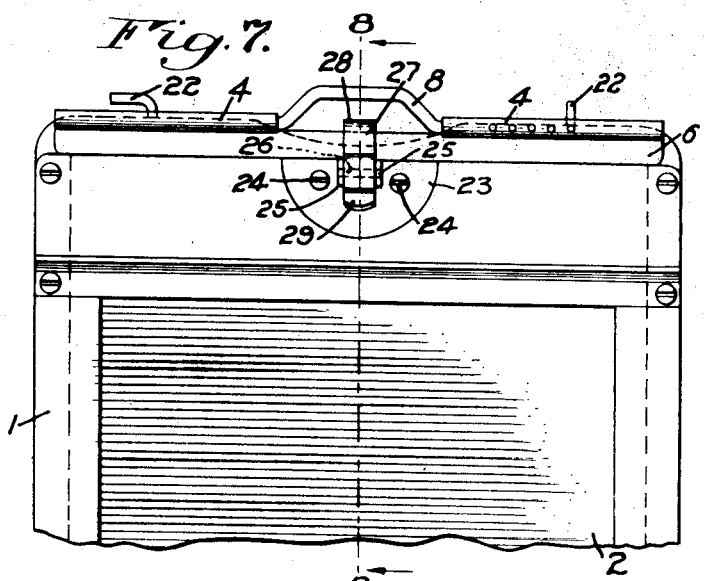
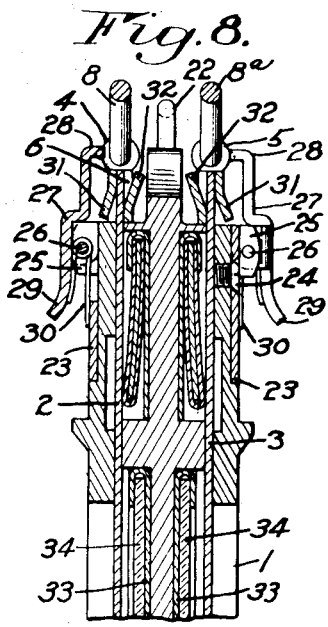
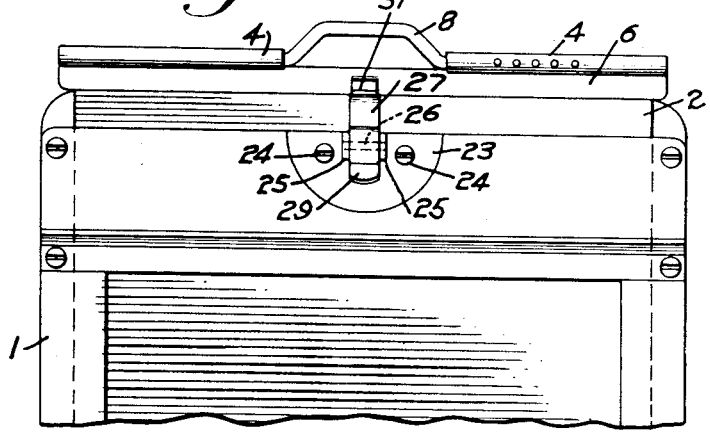
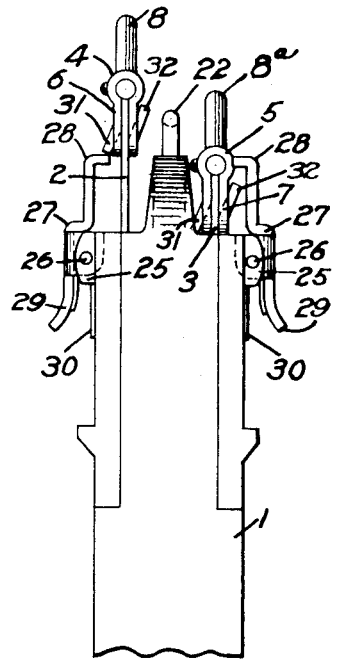
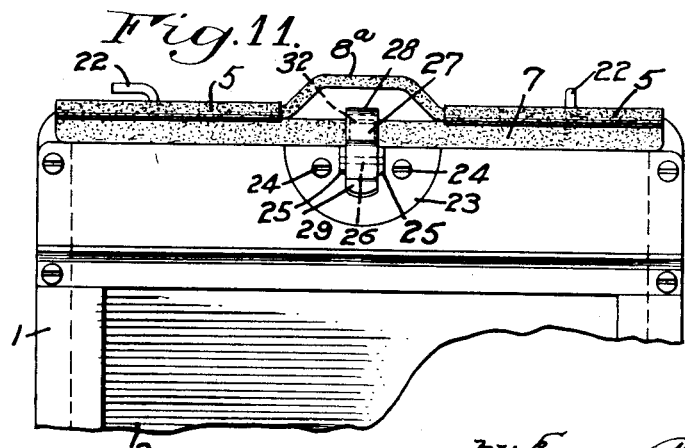
INVENTORS
William E. Burnell,
William H. Petit,
Charles H. Roth,
by their ATTORNEYS Patented Apr. 17, 1934

1,954,918

UNITED STATES PATENT OFFICE 1,954,918

MEANS TO PREVENT DOUBLE EXPOSURES IN USING PLATE OR FILM HOLDERS FOR CAMERAS

William E. Burnell, Penn Yan, and William H. Petit and Charles H. Roth, Rochester, N. Y., assignors to Folmer Graflex Corporation, Rochester, N. Y., a corporation of Delaware Application September 3, 1932, Serial No. 631,672

8 Claims. (Cl. 95—71)

This invention relates to means for preventing double exposures when using plate or film holders for cameras of any description and is an improvement upon that type of the broad invention that is disclosed in the co-pending application of William E. Burnell, Serial No. 631,671, filed September 3, 1932.

In order that the principle of the invention may readily be understood we have disclosed two different embodiments of the invention, each of which is herein claimed.

In the drawings, the first embodiment of our invention is represented in Figs. 1 to 6 inclusive and the second form of the invention is represented in Figs. 7 to 11 inclusive.

Fig. 1 is a side elevation of the upper end of a plate or film holder having our invention applied thereto, the slide being properly in position over an unexposed plate;

Fig. 2 is a side elevation, partly in vertical section (on the dotted line 2—2 of Fig. 3 and looking in the direction of the arrow thereon) of the construction shown in Fig. 1;

Fig. 3 is a view similar to Fig. 1 but representing the slide as pushed only partly home over an unexposed plate or film;

Fig. 4 is a detail in perspective upon an enlarged scale of one member of the indicating and slide-retaining means of our invention;

Fig. 5 is a view similar to Fig. 1 but with the slide properly inserted over an exposed plate, a part of the slide being shown in section;

Fig. 6 is a view upon an enlarged scale of the construction shown in Fig. 5;

Fig. 7 is a view similar to Fig. 1 but of the second embodiment of the invention;

Fig. 8 is a vertical section on the dotted line 8—8 of Fig. 7 looking in the direction of the arrows in said Fig. 7;

Fig. 9 is a view similar to Fig. 7, but representing the slide as pushed only partly home over an unexposed plate;

Fig. 10 is a side elevation of the holder containing the second embodiment of our invention, one of the slides being fully home and the other not pushed fully home; and Fig. 11 is a view similar to Fig. 7 but representing the slide as properly positioned over an exposed plate.

We will refer in order to the two different embodiments of the invention.

Our invention has for its purpose the provision of means to prevent double exposure of a plate or film in photography. The invention is not limited to use in any particular form or type of holder for the plate or film, and it is immaterial whether the invention be practised in connection with a holder containing one plate or film only, or a plurality thereof. We have chosen, however, to illustrate the invention in its two embodiments as applied to an ordinary type of plate or film holder adapted to receive a single plate or film at each face or side thereof, each plate or film to be covered by a slide. In the event that a film is employed, we provide a sheath to receive the film, the sheath with the film being placed in the holder in the usual manner.

Referring first to the form of the invention shown in Figs. 1 to 6, an ordinary holder is represented at 1, it being of wood or other suitable material. Inasmuch as the holder is herein represented as of a duplex type, it is provided with two slides 2 and 3 respectively. The illustration in Fig. 5 may be regarded either as a view of the holder from the side opposite to that shown in Figs. 1 and 3, or as representing the slide of Figs. 1 and 3 as returned to position after exposure of the plate, but for convenience of description Fig. 5 will be regarded as a view of the opposite side of the holder from that shown in Figs. 1 and 3.

We have not represented the exposed or the unexposed plate or film, but it will be understood that in this respect the structure is or may be the same as in the said co-pending case of William E. Burnell. Each slide 2, 3 has opposite contrasting faces. Such contrast may be provided in any suitable manner well known in the art and therefore not requiring detailed description. We have for convenience represented the upper transverse edge 4 of the slide 2 and the upper transverse edge 5 of the slide 3 as differently colored at their two faces respectively. For example, the said edges 4 and 5 may be of aluminum or other light metal suitably bent over and secured to the upper edges of the body of the slides 2, 3. One face of each transversely extending edge 4, 5 is preferably left of the natural aluminum color, as indicated at 6 in Figs. 1 and 2, and the other face is coated by enameling or otherwise of some contrasting color, as indicated at 7 in Fig. 5. Preferably a wire 8, 8a is received within the crimped or beaded portion of the edges 4, 5, and the wire where exposed as a handle, as clearly represented in Figs. 1, 3, and 5, is at its two sides of the colors of the opposite edges 4, 5 at the two faces thereof. Preferably the natural aluminum color is retained at 6 to designate that the slide covers an unexposed plate and the black or other contrasting color 7 is used as represented in Fig. 5 to indicate that the slide covers an exposed plate.

We provide means to prevent, until further manipulation of the parts occurs, the slide from being pushed fully home when the slide is inserted over an unexposed plate, and we also provide means (which may be in part at least the means already referred to) to prevent the slide from being removed (until further manipulation of the parts occurs) after the slide has been fully inserted over an exposed plate. In other words, we provide means whereby the slide cannot be pushed readily or freely fully home over an exposed plate if said slide is through error being inserted with the wrong face outermost, and we provide means whereby a slide covering the exposed plate cannot readily and freely be withdrawn without movement of some other part, thus attracting the user's attention to the fact that such plate has been exposed, and therefore that the slide should not be withdrawn (except for purposes of removing the slide for developing the plate or film).

In the first embodiment of our invention (which in both its forms is an improvement upon the broad type of the invention shown in the said application of William E. Burnell) each face of the holder is provided with means to cooperate with the slide for that face, and the slide is provided with a formation cooperating with a movable member at such face of the holder. Preferably the means at each face of the holder is midwidth thereof at the upper end of the holder and is preferably positioned in a groove or recess 9, 9a preferably very narrow in the direction through the holder from front to back and arcuately shaped to receive a small plate spring 10, 10a to engage either leg 11, 11a, 12, 12a, of a three armed lever 13, 13a, the third arm or head whereof, indicated at 14, 14a, has a bent-over edge or lip 15, 15a under which takes an edge, lip or flange 16 of a U-shaped member 17 shown on an enlarged scale in Fig. 4 and which is secured by a pin 18 to the edge 4 midwidth thereof. The said member 17, at the opposite side or face of the slide, is provided with a lateral projection 19 to take under the inclined shoulder 20, as indicated most clearly in Fig. 6.

It will be understood from the foregoing description that the construction is the same at each side of the holder (that is to say, for each of the slides 2 and 3).

Having thus described the construction of parts shown in Figs. 1 to 6, it will be assumed that the user has just placed an unexposed film or plate in one side of the holder. He will naturally place the slide over the unexposed plate with the white or aluminum face 6 of the transversely extending edge 4 outermost, and as he seeks to push the slide fully home the horizontal flange or edge 16 will strike the top of the head or third arm 14 of the member 13 and prevent the slide from being pushed fully home. The user will therefore rock said member 13 toward the right, viewing Fig. 3, so that said flange or edge 16 will take under the lower end of the edge 15 as the slide is pushed fully home.

Now let it be assumed that an exposure has been made of the same plate and just following that exposure the user attempts carelessly to restore the slide with the white or aluminum face 6 of the transversely extending edge outermost. The said head 14 as positioned in Fig. 3 will prevent this being effected without the manual displacement of the head 14, and since the user has just made an exposure, he will instantly realize his error and will withdraw the slide and reverse the same, whereupon the lateral projection 19 at that face 7 will, as represented in Figs. 5 and 6, automatically slide along the inclined edge 21 of the head 20 and swing said head to the right viewing Figs. 5 and 6 against the force of the spring 10, 10a, so that the slide over the exposed plate will be held in locked position, and the user if he attempts erroneously to remove the slide from over the exposed plate will realize that (the plate having been exposed) the slide should not be withdrawn except for the purpose of developing the plate or film.

It will be understood that the arcuately positioned spring 10 or 10a normally tends to hold the three armed member 13 in the central position indicated in Figs. 3 and 5. It will also be understood that the usual means are or may be provided to retain the slides in position, one form of such means being indicated in subsequent figures.

In Figs. 7 to 11, we have represented a second embodiment of the invention wherein similar parts are correspondingly designated, and therefore need not be more fully referred to. In Figs. 7 and 11, we have represented the turn pins 22 which in one position respectively overlie the upper edges of the slides and in the other position permit the withdrawal thereof.

Midwidth the holder at each face thereof, there is inset a semi-circular plate 23 secured by screws 24 and having spaced outturned lips 25 wherein is mounted upon a pin 26 a lever 27, the upper end of which is bent inwardly at 28 to constitute a hook and the lower part 29 of which is slightly outturned to provide a part to receive inward pressure, as by the thumb of the user. A coiled spring 30 positioned about the pin 26 normally holds the hooked portion 28 inward but not sufficiently to prevent the plate from being slid fully home after the lower edge 31 of the edge portion 6 has passed the same in its downward movement. Said edge 31 is struck or bent outward as indicated most clearly in Fig. 8 and its position is such that when the slide is being inserted with the aluminum-colored face 6 of the edge portion 4 outward, the said edge 31 will strike the upper end of the hook portion 28 and attract the user's attention. Thereupon the lever 27 is moved by the user to permit the slide to be pushed fully home with the aluminum-colored face 6 outward. At the opposite face of the slide there is provided a second struck-out or deflected portion 32, thus providing an edge upon the dark colored side 7 of the slide, which edge 32 will pass under the hooked end 28 of the lever 27 when the slide is being pushed into position with the properly indicating face outward over an exposed plate.

Thus the same purposes are served by this embodiment of the invention as by that embodiment shown in Figs. 1 to 6. Although, in Fig. 8 we have indicated sheaths 33 for films 34, it is to be understood that either films or plates may be employed.

Having thus described two different embodiments of the invention, it is to be understood that although specific terms are employed, they are used in a generic and descriptive sense and not for purposes of limitation, the scope of the invention being set forth in the following claims.

1. In a plate or film holder for cameras wherein each slide is provided with contrasting faces to indicate respectively non-exposure and exposure of the plate or film covered by said slide, indicating means substantially centrally positioned at the upper portion of the holder between the edges thereof to prevent (until further manipulation of the parts occurs) the slide from being pushed fully home when the slide is inserted with the non-exposure indicating face outermost.

2. In a plate or film holder for cameras wherein each slide is provided with contrasting faces to indicate respectively non-exposure and exposure of the plate or film covered by said slide, means substantially centrally positioned at the upper portion of the holder between the edges thereof to prevent the slide from being removed (until further manipulation of the parts occurs) after the said slide has been fully inserted with the exposure indicating face outermost.

3. In a plate or film holder for cameras wherein each slide is provided with contrasting faces to indicate respectively non-exposure and exposure of the plate or film covered by said slide, a plural armed, pivoted member 13 on the holder, and a cooperating projection 16 upon the slide.

4. In a plate or film holder for cameras wherein each slide is provided with contrasting faces to indicate respectively non-exposure and exposure of the plate or film covered by said slide, a three-ended member 13, the head 14 whereof is adapted to engage a projection upon the slide, said slide having a flange 16 at one face and a projection 19 at the opposite face, to engage said head 14.

5. In a plate or film holder for cameras wherein each slide is provided with contrasting faces to indicate respectively non-exposure and exposure of the plate or film covered by said slide, indicating means substantially centrally positioned at the upper portion of the holder between the edges thereof to prevent, until further manipulation of the parts occur, the slide from being pushed fully home when the slide is inserted with the non-exposure indicating face outermost, said means including a two armed lever pivoted upon said holder, one arm adapted to receive manual pressure and the other arm having a hook portion to engage the slide.

6. In a plate or film holder for cameras wherein each slide is provided with contrasting faces to indicate respectively non-exposure and exposure of the plate or film covered by said slide, indicating means substantially centrally positioned at the upper portion of the holder between the edges thereof to prevent, until further manipulation of the parts occur, the slide from being pushed fully home when the slide is inserted with the non-exposure indicating face outermost, said means including a two armed lever pivoted upon said holder, one arm adapted to receive manual pressure and the other arm having a hook portion to engage the slide, said slide having an edge or formation to be engaged by the said hook portion.

7. In a plate or film holder for cameras wherein each slide is provided with contrasting faces to indicate respectively non-exposure and exposure of the plate or film covered by said slide, a two armed lever pivoted upon said holder, one arm adapted to receive manual pressure and the other arm having a hook portion to engage the slide, said slide having two oppositely struck-out portions 31, 32 for cooperation with said lever.

8. In a plate or film holder for cameras wherein each slide is provided with contrasting faces to indicate respectively non-exposure and exposure of the plate or film covered by said slide, a pivoted member 27 upon the holder, and struck-out portions 31, 32 upon the cooperating slide.

WILLIAM E. BURNELL.
WILLIAM H. PETIT.
CHARLES H. ROTH.